July 12, 1932.  C. F. MOCK  1,867,520
SAW SET
Filed April 3, 1931
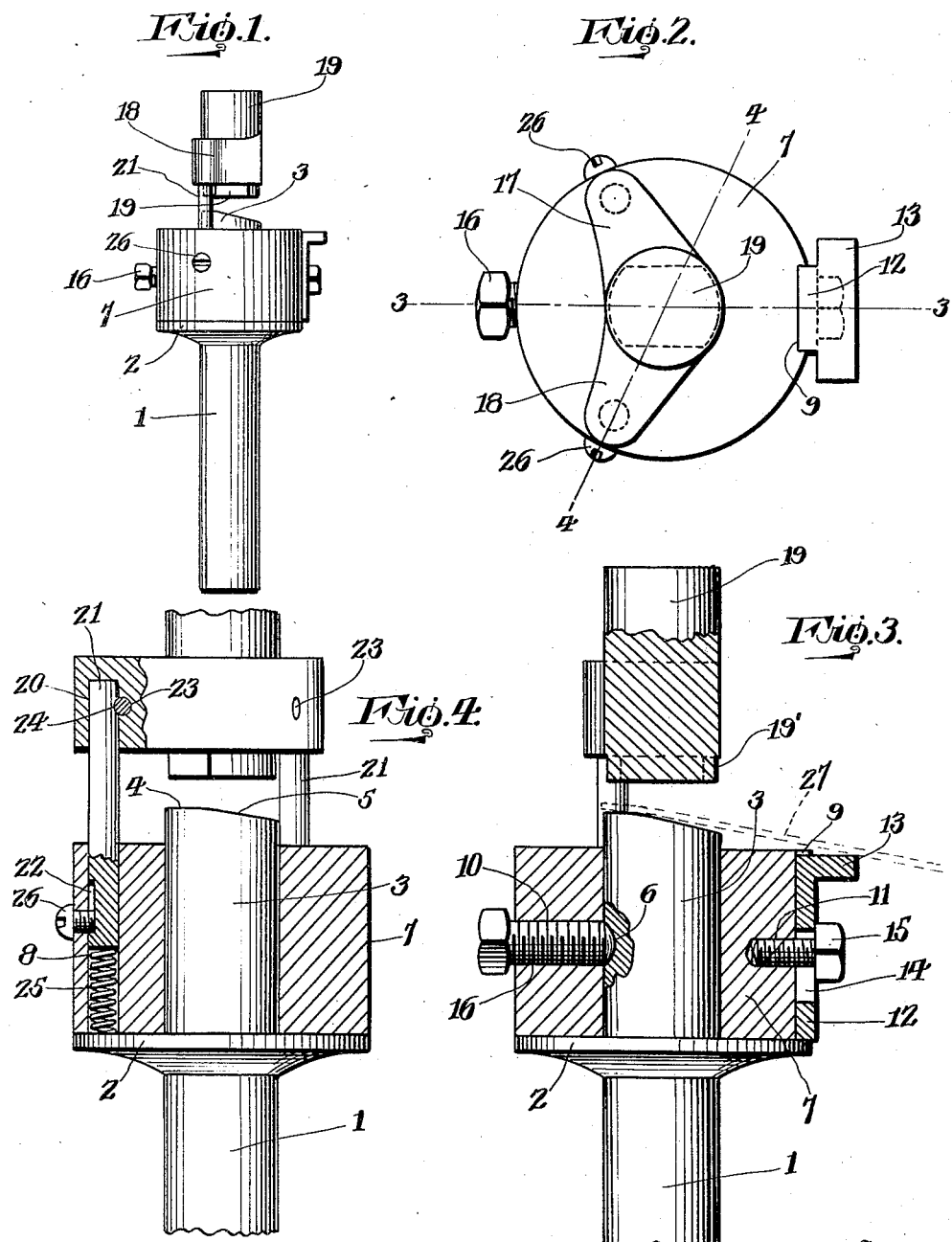
Inventor
Charles F. Mock
By Geo. P. Kimmel
Attorney Patented July 12, 1932

1,867,520

UNITED STATES PATENT OFFICE

CHARLES F. MOCK, OF TOLEDO, OREGON

SAW SET

Application filed April 3, 1931. Serial No. 527,547.

This invention relates to a saw set designed primarily for setting saws employed in lumbering operations, but it is to be understood that a saw set in accordance with this invention may be employed in any connection for which it may be found applicable, and the invention has for its object to provide, in a manner as hereinafter set forth, a saw set for expeditiously setting the teeth of the saw at the desired angle and with a reduction to a minimum of damage to the saw during the setting operation.

In the lumbering operations of the northwest and other districts the saws in use must be kept in good working condition, one of the requirements is that the teeth must have the proper set or slant from vertical. If the saw is too much set or not enough set it will not run properly, and to overcome this objection men are employed solely to file and set saws, inasmuch as the saws do not retain the proper set under constant use. The method commonly employed is to hold a heavy iron with a beveled edge against the teeth and strike it with a hammer, but generally the set is not accurate and further striking the saw with the hammer generally damages it. To overcome the objections just noted is another object of this invention and a saw set constructed in a manner as hereinafter set forth will obtain more accurate setting, enabling the set to be had in less time and further whereby during the setting operation the damage of the saw is reduced to a minimum.

Further objects of the invention are to provide, in a manner as hereinafter set forth, a saw set which is simple in its construction and arrangement, strong, durable, compact, thoroughly efficient in its use, conveniently operated, readily assembled and comparatively inexpensive to manufacture.

With the foregoing and other objects in view, the invention consists of the novel construction, combination and arrangement of parts as hereinafter more specifically described, and illustrated in the accompanying drawing, wherein is shown an embodiment of the invention, but it is to be understood that changes, variations and modifications can be resorted to which fall within the scope of the claims hereunto appended.

In the drawing wherein like reference characters denote corresponding parts throughout the several views:

Figure 1 is a side elevation of a saw set in accordance with this invention.

Figure 2 is a top plan view thereof.

Figure 3 is a section on line 3—3, Figure 2.

Figure 4 is a section on line 4—4 Figure 2.

A saw set in accordance with this invention includes a setting element comprising a cylindrical handle 1 which terminates at one end into and axially of one face of a circular disc 2 of materially greater diameter than the diameter of the handle portion 1. Projecting from the other face and axially of the disc 2 is a cylindrical anvil 3 having its working face formed with flat and downwardly inclined portions 4, 5 respectively. The flat portion 4 is of segmental contour and its greatest width is less than the width of portion 5. The portion 5 inclines downwardly from the squared terminus of the portion 4. The inclination of portion 5 is as desired. The working face of the anvil 3 is provided at the free end of the latter. The periphery of anvil 3 is formed with a recess 6 of concave cross section.

Seated upon the flange 2 is a cylindrical drum 7 having its outer diameter the same as the diameter of disc 2. The inner diameter of drum 7 is such as to snugly fit the anvil 3. The height of drum 7 is less than the height of the anvil 3. The drum 7 in proximity to its outer periphery is formed with a pair of spaced openings 8 which extend from the inner to the outer end of the drum, and the latter has its outer periphery provided with a lengthwise extending groove 9 of rectangular cross section and which extends from the inner to the outer end of the drum. Formed in drum 7 and extending from its outer to its inner periphery is an opening 10 provided with a threaded wall and said drum is furthermore formed with a diametrically disposed socket 11 opening into the groove 9 and having a threaded wall. The axes of the openings 8 are parallel and are disposed on opposite sides of the axis of drum 7.

Adjustably mounted in the groove 9 is a gauge member 12 provided at its outer end with an outwardly directed right angularly disposed flange 13 and intermediate its ends with a slot 14. The gauge member 12 is of less length than the length of drum 7. The gauge member 12 is secured in its adjusted position by a set screw 15 which extends through the slot 14 and engages with the threaded wall of the socket 11. The drum 7 is fixedly secured to the anvil 3 by a clamping screw 16 which has threaded engagement with the wall of the opening 10 and seats in the recess 6. When the screw 16 seats in the recess 6 the movement of the anvil 3 relative to the drum 7 is prevented.

The saw set also includes a saw impacting element or hammer and which comprises a pair of angularly disposed arms 17, 18 terminating at their inner ends into an impact receiving head 19 of cylindrical contour and which has its lower portion reduced to provide a saw impacting head or hammer head 19′. The arms 17, 18 are provided with vertical sockets 20 in proximity to their outer ends and which open at the bottom of the arms. Extending into each socket 20, as well as depending from an arm is a spring controlled rod 21 formed with a peripheral groove 22 in proximity to its lower end. The rods are anchored to the arms by pins 23 extended through the arms and seated in grooves 24 formed in the periphery of the rods near the upper ends thereof. The rods 20 extend into the openings 8 and bear against coiled controlling springs 25 which are interposed between the inner ends thereof and the disc 2. Carried by the drum 7 are set screws 26 which extend into the grooves 22 for limiting the inward and outward movements of the rods 21 with respect to the drum 7. The springs 25 normally maintain the head in spaced relation with respect to the working face of the anvil 3.

The position of the saw when it is to be acted upon by the set is shown in dotted lines Figure 3 and indicated at 27. The saw seats on the beveled portion 5 of the anvil 3 and also upon the flange 13 of gauge member 12. The gauge member 12 is adjusted for the purpose of adjusting the position of the saw 27 when it is desired to set the latter. The saw 27 during the setting operation is positioned over the flat portion 4 of the working face 4 of the anvil 3.

When a blow is applied to the head 19 it is shifted toward the anvil 3 against the action of the controlling springs 25 and causes the head 19′ to impact against the saw.

What I claim is:—

1. A saw set comprising a vertical drum, a saw setting element mounted within, axially of and projecting from the drum, an impact receiving head, a saw impacting head depending from and having its axis forming a continuation of the axis of the impact receiving head and arranged over said element, a pair of oppositely extending angularly disposed arms integral with said impact receiving head and having their ends in alignment, and spring controlled means slidably supported in said drum at spaced points and secured to the outer ends of said arms.

2. A saw set comprising, a handle, a disc secured axially of its inner face to one end of the handle, an anvil secured to the other face of said disc axially of the latter, a drum encompassing and of less length than the anvil and positioned against the outer face of the disc, means for securing the anvil and drum together, a pair of spring controlled, spaced, aligning rods slidably mounted in, permanently extending from and positioned in proximity to the outer face of the drum, a blow driven saw impacting means arranged over said anvil, and angularly disposed means extending in opposite directions from said saw impacting means for connecting the latter with the outer ends of said rods.

3. A saw set comprising, a handle, a disc secured axially of its inner face to one end of the handle, an anvil secured to the other face of said disc axially of the latter, a drum encompassing and of less length than the anvil and positioned against the outer face of the disc, means for securing the anvil and drum together, a pair of spring controlled, spaced, aligning rods slidably mounted in, permanently extending from and positioned in proximity to the outer face of the drum, a blow driven saw impacting means arranged over said anvil, angularly disposed means extending in opposite directions from said saw impacting means for connecting the latter with the outer ends of said rods, said drum having a lengthwise extending groove in its outer periphery, and an adjustable gauge slidably mounted in said groove.

4. A saw set comprising a support formed axially thereof with an anvil, a drum positioned against the support, encompassing and of less length than the anvil, means for connecting the drum to the anvil, a saw impacting element including a pair of angularly disposed arms opposing the drum and each having a socket opening at the lower face thereof, a pair of reciprocatory, spring controlled rods slidably connected to the drum at spaced points and extending into said sockets, and means for securing the rods to said arms, said element including a depending head aligning with said anvil, and said rods normally maintaining said head in superposed spaced relation with respect to said anvil.

5. A saw set including an anvil, a support carrying and having said anvil arranged axially thereof, a drum encompassing and detachably connected to said anvil, the latter projecting from the outer end of the drum, and a reciprocatory spring controlled saw impacting element slidably connected at spaced points to said drum and having centrally thereof an impacting head opposing said anvil.

6. A saw set including an anvil, a support carrying and having said anvil arranged axially thereof, a drum encompassing and detachably connected to said anvil, the latter projecting from the outer end of the drum, a reciprocatory spring controlled saw impacting element slidably connected at spaced points to said drum and having centrally thereof an impacting head opposing said anvil, said drum having its outer periphery grooved, and a flanged gauge adjustably mounted in said groove.

In testimony whereof, I affix my signature hereto.

CHARLES F. MOCK.